United States Patent
Gallagher

(10) Patent No.: US 7,583,858 B2
(45) Date of Patent: *Sep. 1, 2009

(54) IMAGE PROCESSING BASED ON DIRECTION OF GRAVITY

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 896 days.

This patent is subject to a terminal disclaimer.

(21) Appl. No.: 10/963,157

(22) Filed: Oct. 12, 2004

(65) Prior Publication Data

US 2006/0078214 A1  Apr. 13, 2006

(51) Int. Cl.
 *G06K 9/32* (2006.01)
 *G06T 15/10* (2006.01)
 *G06K 9/36* (2006.01)
(52) U.S. Cl. ..................... 382/296; 345/427
(58) Field of Classification Search .............. 382/154, 382/254, 275, 276, 278, 293, 296, 224, 289; 345/158, 427; 396/321; 358/906; 348/147, 348/208.2, 208.4, 208.6, 231.6, 239, 552, 348/580, E5.046, E5.078, 208.5
See application file for complete search history.

(56) References Cited

U.S. PATENT DOCUMENTS

| 5,227,889 | A | 7/1993 | Yoneyama et al. |
| 5,528,194 | A | 6/1996 | Ohtani et al. |
| 5,651,075 | A | 7/1997 | Frazier et al. |
| 5,900,909 | A | 5/1999 | Parulski et al. |
| 6,778,699 | B1 * | 8/2004 | Gallagher ............ 382/165 |
| 6,781,623 | B1 * | 8/2004 | Thomas ............ 348/208.4 |
| 6,968,094 | B1 * | 11/2005 | Gallagher ............ 382/296 |
| 7,277,594 | B2 * | 10/2007 | Hofstetter et al. ....... 382/275 |
| 2001/0010514 | A1 * | 8/2001 | Ishino ............ 345/158 |
| 2004/0240750 | A1 * | 12/2004 | Chauville et al. ....... 382/275 |
| 2005/0179688 | A1 * | 8/2005 | Chernichenko et al. ... 345/427 |
| 2006/0056703 | A1 * | 3/2006 | Sathyanarayana ....... 382/224 |
| 2006/0078214 | A1 * | 4/2006 | Gallagher ............ 382/254 |
| 2006/0078215 | A1 * | 4/2006 | Gallagher ............ 382/254 |

* cited by examiner

*Primary Examiner*—Amir Alavi
(74) *Attorney, Agent, or Firm*—Raymond L. Owens

(57) ABSTRACT

A method of processing a digital image to produce an improved digital image, includes receiving the digital image captured with a camera; determining a first vanishing point associated with the digital image; determining a second vanishing point associated with the digital image corresponding to a direction orthogonal the first vanishing point; determining a transform for modifying the digital image based on the first vanishing point and the second vanishing point; and applying the transform to the digital image to produce an improved digital image.

4 Claims, 8 Drawing Sheets

IMAGE PROCESSING BASED ON DIRECTION OF GRAVITY

CROSS REFERENCE TO RELATED APPLICATIONS

Reference is made to commonly assigned U.S. patent application Ser. No. 09/663,056 filed Sep. 15, 2000, entitled "A Method of Estimating and Correcting Camera Rotation With Vanishing Point Location, and U.S. patent application Ser. No. 10/963,344 filed concurrently herewith, entitled "Image Processing Based on Direction of Gravity" by Andrew C. Gallagher, the disclosures of which are incorporated herein.

FIELD OF INVENTION

The present invention relates to image processing of digital images captured by a digital camera based on the direction of gravity.

BACKGROUND OF THE INVENTION

Most consumer cameras are designed such that the lens and image sensors are parallel, and their centers fall on a line orthogonal to the image sensor. This arrangement generally produces good photographic results. However, due to perspective projection, parallel lines in the scene can appear to converge in the image. This phenomena is known as perspective distortion.

Perspective distortion is well known in photography. Traditionally, a view camera permits the photographer to avoid perspective distortion. This is accomplished by having independent control over the position of both the lens plane and the image plane. Lines in the scene that are parallel to the image sensor plane will appear parallel on the image. A view camera permits the photographer to control the character of the distortion that occurs by projecting a three-dimensional scene onto a two-dimensional image plane. The controls can be used to either reduce, modify, or increase the perspective distortion. View cameras are expensive and complex due to the many moving parts. In addition, traditional view cameras use film and lack many of the features of modern digital cameras.

Image warping is a well-known tool that may be used to modify the apparent perspective of an image. For example, U.S. Pat. No. 5,651,075 by Frazier et al., describes a method of compensating for the perspective distortion present in an image of a license plate captured at a known camera to subject distance. This patent describes a method of modifying the perspective by using the known relationship between the camera and the subject, which relationship is always constant. This arrangement would not be practical for general use at reducing perspective distortion.

In U.S. Pat. No. 5,227,889, Yoneyama et al describe a video camera having a sensor for detecting slant of the camera. The image is then rotated to remove the effect of the slant from the image. Their video camera cannot reduce perspective distortion.

In U.S. Pat. No. 5,900,909, Parulski et al describe a digital camera having a sensor for detection the orientation of the camera at the time an image is captured. Based on the orientation, the image is rotated by a multiple of 90 degrees so that the top of the image corresponds to the "up" direction. This camera cannot reduce perspective distortion in the image.

In U.S. Pat. No. 5,528,194, Ohtani et al describe a camera and processing to apply a geometric transform to an image captured with the camera. The geometric transform is derived based on a measured azimuth angle between the camera and the subject. According to col. 4. lines 10-14, the sensor measuring the azimuth needs to record the relative angle to the subject being photographed. The sensor can be a GPS (global positioning satellite) or a geomagnetic sensor that determines a three-dimensional position of both the camera and subject to determine the azimuth angle. GPS and geomagnetism measuring devices are expensive. In addition, camera requires determining the three-dimensional position of the subject, which is often difficult or impossible when the subject is inaccessible.

SUMMARY OF THE INVENTION

It is an object of the present invention to image process a digital image based on the vanishing points.

This object is achieved by a method of processing a digital image to produce an improved digital image, comprising:

(a) receiving the digital image captured with a camera;

(b) determining a first vanishing point associated with the digital image;

(c) determining a second vanishing point associated with the digital image corresponding to a direction orthogonal the first vanishing point;

(d) determining a transform for modifying the digital image based on the first vanishing point and the second vanishing point; and (e) applying the transform to the digital image to produce an improved digital image.

The present invention has the following advantages:

digital images are modified to generate improved digital image with reduced perspective distortion or unintentional camera rotation;

images captured with a camera having a gravity sensor have good sharpness due to selecting a proper exposure time for capturing an image; and a horizon can be identified in the image which can be used to correct the image for unintentional camera rotation or to identify regions as, for example, flesh, sky, water, pavement, clouds, or grass based on the position of the regions relative to the horizon.

DETAILED DESCRIPTION OF THE INVENTION

Figure 1:
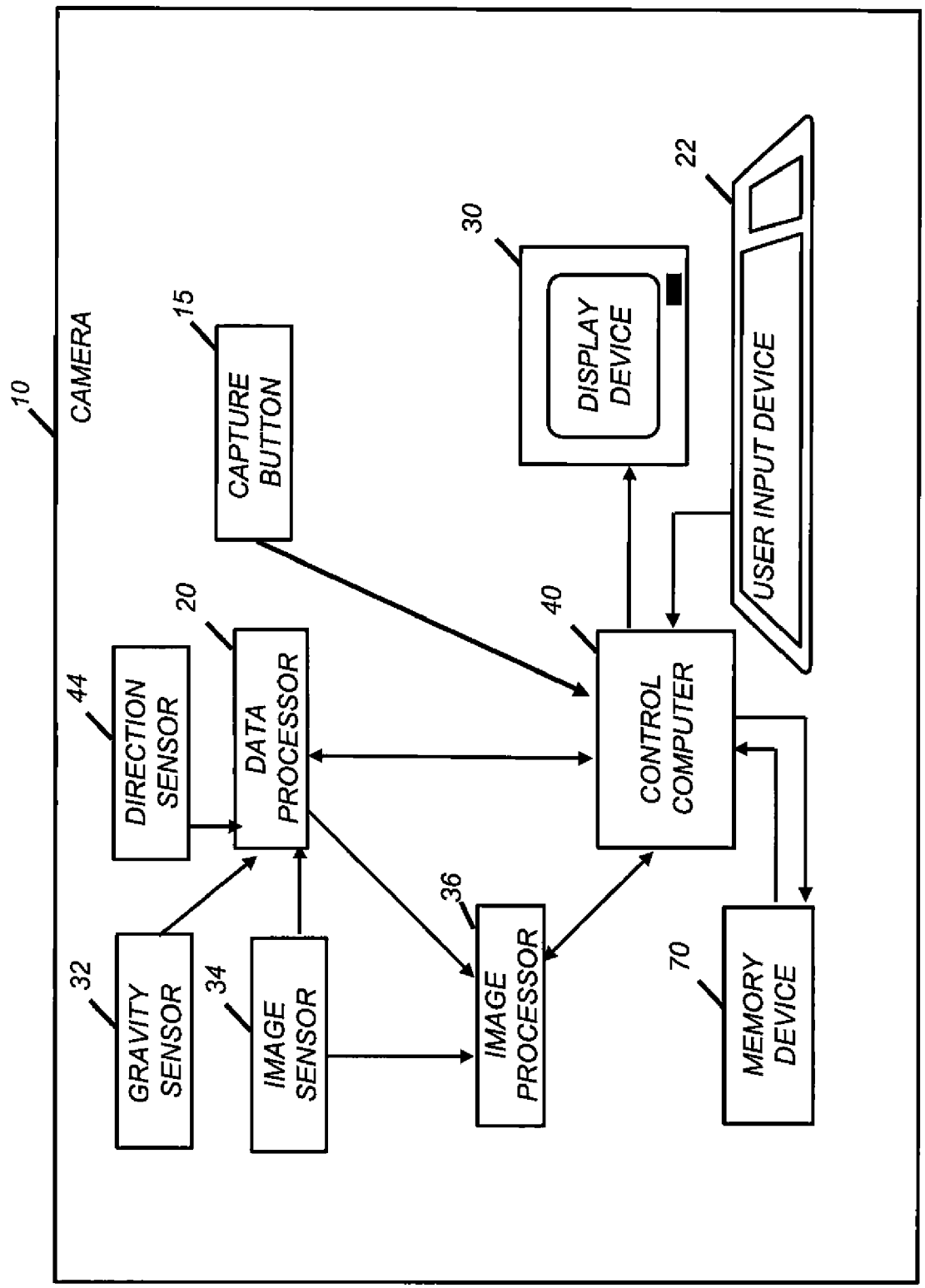
FIG. 1 is a block diagram of a computer system suitable for practicing the present invention.

FIG. 1 shows the inventive digital camera 10. The camera includes user inputs 22. As shown, the user inputs 22 are buttons, but the user inputs could also be a joystick, touch screen, or the like. The user uses the user inputs 22 to command the operation of the camera 10, for example by selecting a mode of operation of the camera 10. The camera 10 also includes a display device 30 upon which the user can preview images captured by the camera 10 when a capture button 15 is depressed. The display device 30 is also used with the user inputs 22 so that the user can navigate through menus. The display device 30 can be, for example, a LCD or OLED screen, as are commonly used on digital cameras. The menus allow the user to select the preferences for the camera's operation. The camera can capture either still images or image in rapid succession such as a video stream.

A general control computer 40 shown in FIG. 1 can store the present invention as a computer program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by a memory device 70. The control computer 40 is responsible for controlling the transfer of data between components of the camera 10. For example, the control computer 40 determines that the capture button 15 is pressed by the user and initiates the capturing of an image by an image sensor 34.

An image processor 36 can be used to process digital images to make adjustments for overall brightness, tone scale, image structure, etc. of digital images in a manner such that a pleasing looking image is produced by the display device 30. Those skilled in the art will recognize that the present invention is not limited to just these mentioned image processing functions.

A data processor 20 is used to process image information from the digital image as well as information from a gravity sensor 32 (equivalently, the gravity sensor is a gravity detection device) and a direction sensor 44 to generate positional data for the image processor 36 or for the control computer 40. The operation of the data processor 20 will be described in greater detail hereinbelow.

It should also be noted that the present invention can be implemented in a combination of software and/or hardware and is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Internally, the digital view camera 10 includes the gravity sensor 32 for determining the position of the camera 10 relative to the direction of the earth's gravity direction at arbitrary times. The gravity sensor 32 is capable of determining the position of the camera 10 relative to the direction of the earth's gravity without the need for capturing an image. In other words, the gravity sensor 32 determines the direction of gravity relative to the coordinate system of the camera 10. Those skilled in the art will recognize that in the case the inventive camera is capturing an image at a location other than on planet earth, the gravity sensor 32 determines the direction of the local gravitational field rather than the earth's.

The gravity sensor 32 may be any gravity sensor known in the art, such as spring mass type, falling body/free-fall type, pendulum type, and the like. For example, the EZ-TILT 3000 by Advanced Orientation Systems, Inc. of Linden, N.J. is a suitable gravity sensor 32. The gravity sensor 32 can also be composed of multiple planar tilt sensors, such as the capacitive tile sensor describes in U.S. Pat. No. 6,781,623. In this case, one tilt sensor can be placed parallel to the xy-plane (the image plane) to measure camera rotation and a second can be placed parallel to the yz-plane to measure camera tilt. Those skilled in the art recognize that the signals generated from two such planar sensors can be combined to determine the direction of gravity relative to the coordinate system of the camera.

Figure 2:
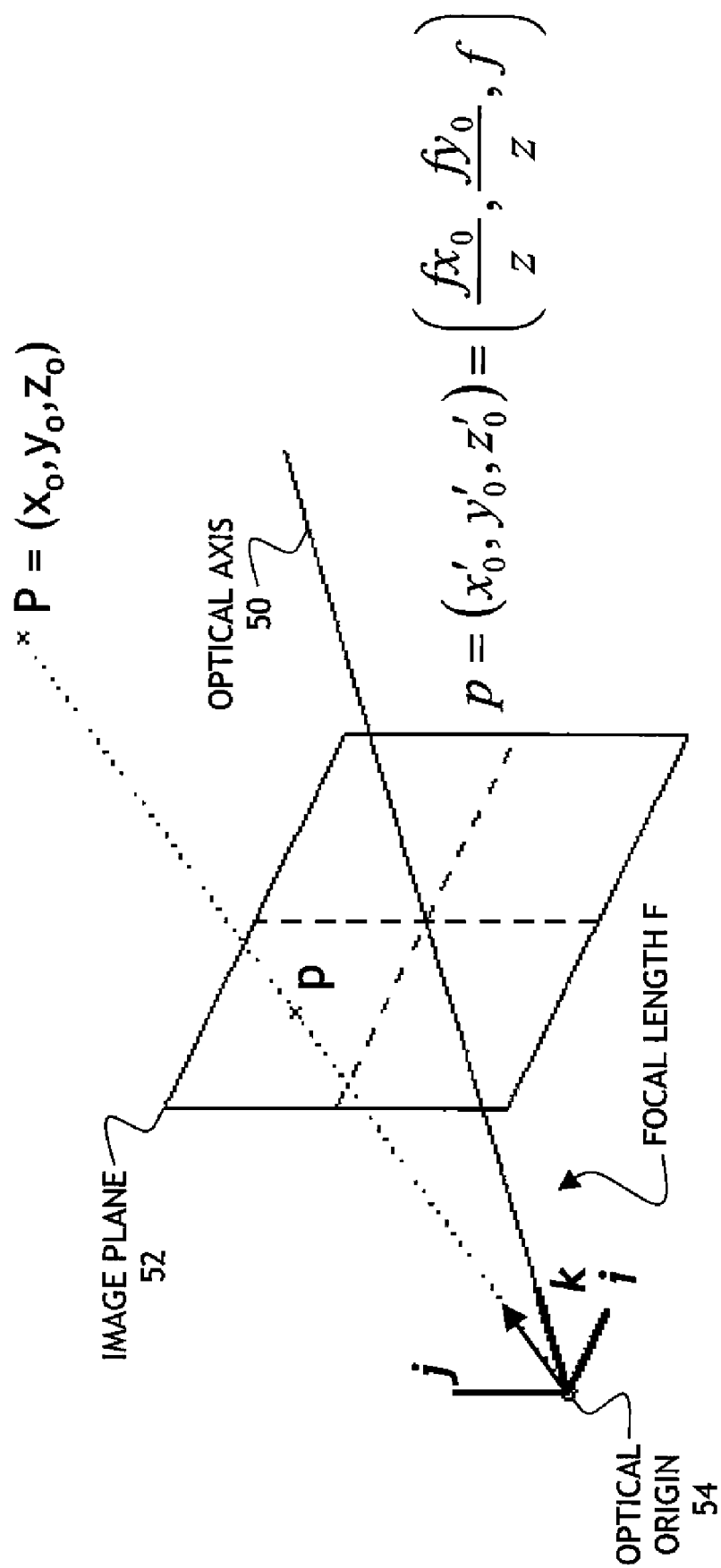
FIG. 2 is a block diagram of the digital image processor of FIG. 1 according to the present invention.

FIG. 2 illustrates the coordinate system of a perspective system that represents the projective imaging of the camera 10. The image sensor 34 of FIG. 1 is coincident with an image plane 52 and captures and digitizes the projected image of the scene. The image sensor 34 can be, for example, a CCD or CMOS device, as are commonly used as the image sensor of digital cameras. As shown in FIG. 2, the image plane 52 (which contains the image sensor 34) falls parallel to an xy-plane. An optical axis 50 of the system is preferably perpendicular to the image sensor, and defines a z-axis. An optical origin 54 is the point (0,0,0). The image plane 52 is located a distance equal to the focal length from the optical origin 54 along the optical axis 50. In actuality, the lenses of camera optical systems result in an inverted image falling on the sensor, but the projective coordinate system of FIG. 2 suffices to describe the relevant system without the added complexity of dealing with an inverted image. Those skilled in the art will readily recognize any necessary adjustments to the equations herein due to the inverted image. The unit vectors i, j, and k are parallel to the x, y and z axes, respectively.

Referring to FIG. 1, the gravity sensor 32 determines the gravity vector $g=x_g i+y_g j+z_g k$. (The gravity vector is expressed as a unit vector in the i, j, and k directions, parallel to the x, y and z axes, respectively and $\|g\|=1$.) Thus, the gravity sensor 32 determines the position of the direction of gravity with respect to the coordinate system of the camera 10. The gravity sensor 32 reports the position of the camera with respect to the gravitational field with two degrees of freedom (the length of the vector is preferably normalized to length 1.0).

Referring again to FIG. 1 optionally an additional direction sensor 44 in the camera can be used to determine the compass direction of the optical axis (i.e. the direction of the optical axis with respect to the earth's magnetic field.) The direction sensor 44 returns a compass vector preferably in the form of the unit vector $d=x_d i+y_d j+z_d k$ that is parallel to the compass north direction. The compass vector is orthogonal to the gravity vector ($g'd=0$) and also has unit length ($\|d\|=1$), so it specifies an additional degree of freedom over the gravity vector. The gravity vector and the compass vector together have three degrees of freedom. The direction sensor 44 may be a compass or a device that accesses the global positioning satellites (GPS).

Figure 3:
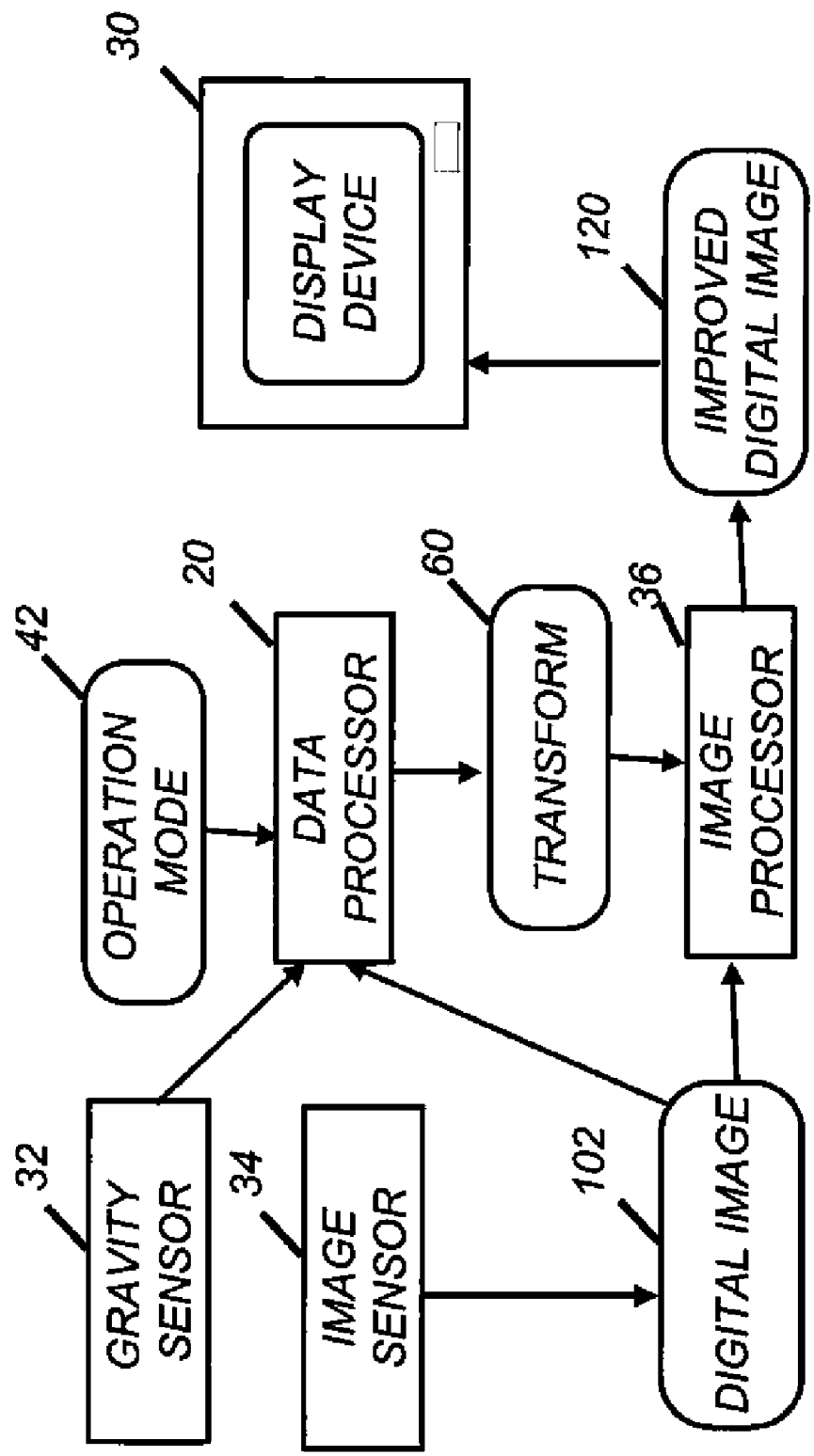
FIG. 3 is a block diagram of the components of a representative digital camera.

Referring to FIG. 3, the image sensor 34 captures a digital image 102 and produces a raw image that is passed to the image processor 36. The image processor 36 prepares the raw image for viewing by interpolating missing pixel values from the image sensor 34, applying color correction matrices, rendering the image, and the like. Additionally, the data processor 20 analyzes the gravity vector g from the gravity sensor 32 and possibly the digital image 102 (or a partially corrected version of the digital image from the image processor 36) to produce a transform 60 in accordance with an operating mode 42 of the camera. The image processor 36 applies the transform 60 and outputs an improved image 120.

The gravity vector information could be a series of gravity vectors g. For example, the gravity sensor 32 is queried every $\frac{1}{120}$ second as soon as the capture button 15 begins to be depressed, creating a series of gravity positions $g_0$ to $g_n$. In addition, the gravity sensor 32 is queried at substantially the time the image is captured $g_i$. Additional gravity vectors $g_{n+1}$ to $g_m$ can also be recorded after the image is captured. When the camera 10 captures a video stream, there may be one gravity vector g for each digital image of the video stream. Or there may be one gravity vector for several frames of the video stream. There may also be several gravity vector positions for each frame of the video stream.

The image 102 has an associated gravity vector g that relates to the direction of gravity relative to the camera's coordinate system at substantially the time the image 102 was captured. Those skilled in the art will recognize that the gravity vector g may relate to the position of the camera slightly before or after the digital image 102 (e.g. $\frac{1}{30}$ second) is actually captured. Because the direction of gravity relative to the camera's coordinate system changes slowly, a gravity vector acquired slightly before or after the time it image is captured is said to be captured at "substantially the time" the digital image was captured.

Several additional metadata items (metadata is information related to the image not including pixel data) are also input to the data processor 20. The focal length $f_l$ (in pixels) at the time of image capture is included. In addition, metadata includes the current camera settings such as the status of menu items or operating modes as selected by the user.

The data processor 20 may optionally analyze the digital image to determine the vanishing point associated with vertical scene lines. Vertical scene lines are lines in the scene (real world) that are parallel with the gravity vector (i.e. orthogonal to the ground plane), thus the gravity vector associated with the digital image 102 is equivalent to the vanishing point of vertical scene lines. Vertical scene lines and planes (e.g. edges formed by the intersection of walls and the walls themselves) occur frequently in human construction. A vanishing point is the point in the image where the image of parallel scene lines meet. The vanishing point of vertical scene lines (in homogenous coordinates) is the gravity vector. Thus, the gravity vector conveys a great deal of information concerning the image of the scene due to the fact that vertical construction is dominant in many photographed scenes.

The data processor 20 may optionally analyze the digital image 102 to refine the gravity vector estimate g provided by the gravity sensor 32 or to search for additional vanishing points. An algorithm to automatically detect vanishing points is described in U.S. Pat. No. 6,778,699. Briefly summarized, vanishing points are detected from the image by:

a) detecting line segments in the image;

b) determining intersections from pairs of line segments;

c) assigning a probability to each intersection of the pairs of line segments;

d) determining a local maximum corresponding to a plurality of probabilities; and e) outputting an estimated vanishing point vector that corresponds to the determined local maximum.

The gravity vector estimate g from the gravity sensor 32 can be refined by finding a vanishing point in the digital image 102 having a high probability that is within the expected directional error of the gravity estimate from the gravity sensor 32. For example, suppose a vanishing point is found by analyzing the image with the data processor 20 that has high confidence and is $\pi/180$ radians from the gravity vector from the gravity sensor and the expected directional error of the gravity sensor 32 is $\pi/90$ radians. In this case, the vanishing point found by the data processor 20 would supercede the gravity vector from the gravity sensor 32 and is used for future calculations. Alternatively, the final gravity vector could be an average or combination of the gravity vector determined from the gravity sensor 32 and the gravity vector found from image processing in the data processor 20. The gravity vector g associated with the digital image 102 could be stored as metadata (metadata is information related to the image not including pixel data) associated with the digital image 102.

The data processor 20 can be used to detect additional image vanishing points, preferably vanishing points orthogonal to the gravity vector. The idea is to detect the vanishing points of scene lines that are orthogonal to the vertical scene lines. For example, in a brick wall, the lines along rows of bricks define a horizontal vanishing point while the lines along columns of bricks are vertical scene lines defining a vertical vanishing point (coincident to the gravity vector). A set of two vanishing points related to two orthogonal sets of lines (i.e. the vertical lines parallel to gravity and the horizontal lines parallel to the scene ground plane are orthogonal) define a vanishing line for planes parallel to both sets of lines. The data processor 20 then generates the transform 60 based on the gravity vector and possibly additional vanishing points found with image analysis.

The data processor 20 outputs the transform 60 for modifying the digital image 102 for producing an improved digital image 120. The improved digital image 120 may be viewed or reviewed on the display device 30 so that the user can see the image and decide whether to accept the image, delete the image, modify parameters associated with the data processor 20, or simply keep the original digital image 102 instead of the improved digital image 120. The transform 60 is generated by the data processor by considering the gravity vanishing point g, and any additional data to calculate a projective transformation to modify the perspective distortion of the image.

The gravity vanishing point g is conveniently expressed as: $v_1=[v_{11}\ v_{12}\ v_{13}]'$ and represents the point of intersection between the image plane and the line passing through the origin with direction g (i.e. the direction of gravity relative to the camera coordinate system.)

where $$v_{11} = \frac{x_g f_l}{z_g}$$

$$v_{12} = \frac{y_g f_l}{z_g}$$

$$v_{13} = f_l$$

where $f_l$ is the focal length (in pixels) of the camera. The point $p_1=[v_{11}\ v_{12}]'$ represents the vanishing point (i.e. the point of intersection of vertical scene lines that are parallel to gravity's direction vector) on the image plane.

In general, the transform 60 is created by determining preferred positions for the gravity vanishing point (and possibly additional vanishing points). The transform 60 is such that the gravity vanishing point and any additional vanishing points are mapped by the transform (according to equation (8) to be discussed hereinbelow) to the respective preferred positions.

The transform 60 can be computed based on a user-selectable operating mode 42. Preferably the transform 60 is a homography, a linear transformation of homographic coordinates. For example, if the camera is in "Reduce Perspective Distortion" mode, then the transform 60 is homography $H_1$ and is computed as follows:

$$H_1 = \begin{bmatrix} 1 & 0 & 0 \\ 0 & 1 & 0 \\ -\frac{v_{11}}{v_{11}^2+v_{12}^2} & -\frac{v_{12}}{v_{11}^2+v_{12}^2} & 1 \end{bmatrix}. \quad (1)$$

Note that if $z_g$ is 0, then limits can be used to calculate $H_1$, and $H_1$ is found to be the identity matrix.

In this case, the preferred position for the gravity vanishing point is $v_p=[v_{11}\ v_{12}\ 0]'$ in homogeneous coordinates, i.e. the vanishing point is located at infinity on the image plane but at the same orientation as the original vanishing point $v_1$.

The homography $H_1$ is such that, when applied to the digital image 102 through a warping process applied by the image processor 36, the result is an improved digital image 120 with the vertical line vanishing point at infinity. Therefore, the improved digital image 120 generally has reduced perspective distortion relative to the digital image 102. Experimental evidence shows that this new image is usually more preferred then leaving the image unwarped.

Alternatively, if the camera is in "Reduce Camera Rotation" mode, the transform 60 is a rotation $H_{1R}$ and is computed as follows:

$$H_{1R} = \begin{bmatrix} \cos\alpha & -\sin\alpha & 0 \\ \sin\alpha & \cos\alpha & 0 \\ 0 & 0 & 1 \end{bmatrix} \quad (2)$$

where $$\alpha = -\left(\text{mod}\left(\tan^{-1}(v_{12},v_{11}),\frac{\pi}{2}\right)-\frac{\pi}{4}\right) \quad (3)$$

The transform $H_{1R}$ is used to remove the tilt that is apparent in images when the camera is unintentionally rotated with respect to the scene (i.e. when the gravity vector is not orthogonal to the x-axis or y-axis of the imaging system). The angle $\alpha$ represents the negative of the angle of rotation of the camera from a vertical orientation, and the transform $H_{1R}$ is applied by the image processor 36 to produce an enhanced digital image 120 rotated by angle a relative to the original digital image 102, thereby removing the effect of undesirable rotation of the camera from the image.

In the "Reduce Camera Rotation" mode, the preferred position for the gravity vanishing point is on either the x or the y axis ($v_p=[u\ 0\ 1]'$ or $v_p=[0\ u\ 1]'$ in homogeneous coordinates, where u has the magnitude of $p_1$.)

In a similar manner as taught by Parulski in U.S. Pat. No. 5,900,909, the transform 60 may also be used to reorient the digital image 102 based on the gravity vector when the camera is in "Right Side Up Orientation" mode:

$$H_{1O} = \begin{bmatrix} \cos\alpha & -\sin\alpha & 0 \\ \sin\alpha & \cos\alpha & 0 \\ 0 & 0 & 1 \end{bmatrix} \quad (4)$$

where $$\alpha = \begin{cases} 0 & -\frac{3\pi}{4} < \tan^{-1}(v_{12},v_{11}) \le -\frac{\pi}{4} \\ \frac{\pi}{2} & -\frac{\pi}{4} < \tan^{-1}(v_{12},v_{11}) \le \frac{\pi}{4} \\ \pi & \frac{\pi}{4} < \tan^{-1}(v_{12},v_{11}) \le \frac{3\pi}{4} \\ -\frac{\pi}{2} & \text{otherwise} \end{cases} \text{ when} \quad (5)$$

In "Right Side Up Orientation" mode, the preferred position for the gravity vanishing point is to be as close as possible to the negative y-axis, constrained by the fact that the transform 60 can only be a rotation be a multiple of $\pi/2$.

Alternatively, if the camera is "Rectify Plane" mode, then the transform 60 is homography $H_2$.

The homography $H_2$ can be computed that will rectify the plane associated with any two orthogonal vanishing points (in this case, the two vanishing points are the gravity vector and the horizontal vanishing point.) Two vanishing points are said to be orthogonal if their dot product is zero.

$$H_2 = R*A*T*R^{-1} \quad (6)$$

Where:

The auxiliary (horizontal line) vanishing point is $v_2=[v_{21}\ v_{22}\ v_{23}]'$ where $v_{23}$ is the focal length of the camera, and $p_2=[v_{21}\ v_{22}]'$ specifies the location of the horizontal line vanishing point in the image plane.

The requirement that the vanishing points are orthogonal requires that $v_1{}^t v_2=0$. This requirement will be met when the first vanishing point relates to the gravity vanishing point and the second vanishing point relates to the vanishing point of a set of lines in the scene that are parallel to the ground plane.

$$V_L = V_1 - V_2$$

$$v_{L1} = v_{11} - v_{21}$$

-continued $$v_{L2} = v_{12} - v_{22}$$

$$\theta = \tan^{-1}\left(\frac{v_{L2}}{v_{L1}}\right)$$

$$R = \begin{bmatrix} \cos\theta & -\sin\theta & 0 \\ \sin\theta & \cos\theta & 0 \\ 0 & 0 & 1 \end{bmatrix} = \|v_L\|^{-1} \begin{bmatrix} v_{L1} & -v_{L2} & 0 \\ v_{L2} & v_{L1} & 0 \\ 0 & 0 & \|v_L\| \end{bmatrix}$$

$$r_{1y} = [0 \ 1 \ 0] R^{-1} v_1$$

$$T = \begin{bmatrix} 1 & 0 & 0 \\ 0 & 1 & 0 \\ 0 & -\frac{1}{r_{1y}} & 1 \end{bmatrix}$$

$$t_{1x} = [1 \ 0 \ 0] T R^{-1} v_1$$

$$t_{1y} = [0 \ 1 \ 0] T R^{-1} v_1$$

$$t_{2x} = [1 \ 0 \ 0] T R^{-1} v_2$$

$$t_{2y} = [0 \ 1 \ 0] T R^{-1} v_2$$

$$f = \sqrt{-\frac{t_{1y} * t_{2y}}{t_{1x} * t_{2x}}}$$

$$A = \begin{bmatrix} f & 0 & 0 \\ 0 & 1 & 0 \\ 0 & 0 & 1 \end{bmatrix}$$

It can be shown that homography $H_2$ reduces to homography $H_1$ when:

$$H_1 = \lim_{\substack{v_{21} \to -av_{12} \\ v_{22} \to av_{11} \\ a \to \infty}} H_2$$

That is, when the horizontal vanishing point of a plane is already at infinity, then homography $H_2$ reduces to $H_1$.

In "Rectify Plane" mode, the preferred positions for the gravity vanishing point and the auxiliary vanishing point (the horizontal vanishing point) are such that, when transformed by the transform 60 according to equation (8) described hereinbelow, result in mapped vanishing points on the image plane that are orthogonal. This is better explained with the following equations:

The gravity vanishing point maps according to the transform 60 as:

$$\begin{bmatrix} x_1 \\ y_1 \\ w_1 \end{bmatrix} = H \begin{bmatrix} v_{11} \\ v_{12} \\ 1 \end{bmatrix}$$

This results in a mapped gravity vanishing point at image plane location $$g_m = \left[ \frac{x_1}{w_1} \ \frac{y_1}{w_1} \right]'$$

The second vanishing point (the horizontal vanishing point) maps according to the transform 60 as:

$$\begin{bmatrix} x_2 \\ y_2 \\ w_2 \end{bmatrix} = H \begin{bmatrix} v_{21} \\ v_{22} \\ 1 \end{bmatrix}$$

This results in a mapped horizontal vanishing point at image plane location $$v_{2m} = \left[ \frac{x_2}{w_2} \ \frac{y_2}{w_2} \right]'$$

The preferred positions for the vanishing points in "Rectify Plane" mode require that $g_m' \ v_{2m} = 0$. The homography $H_2$ satisfies this requirement.

The homography $H_2$ is such that, when applied to the digital image 102 through a warping process applied by the image processor 36, the result is an improved digital image 120 with the vertical vanishing point at infinity and a horizontal vanishing point also at infinity. The plane associated with the two vanishing points will have been rectified; that is right angles on that plane in the scene will appear to be right angles in the improved digital image 120. Experimental evidence shows that this new image can more preferred than leaving the image unwarped. For example, a rectified image of a billboard could easily be produced despite the fact that the photographer was located below and to one side of the billboard.

Those skilled in the art will recognize that other modes could exist that are combinations of the above described modes for generating the transform 60. For example, the "Reduce Perspective Distortion" and the "Reduce Camera Rotations" modes can be combined as follows:

1. Determine the transform $H_A$ according to Equation (1)
2. Determine new gravity vector g' by computing $g' = H_A \ g$
3. Compute transform $H_B$ according to Equation (2) using g'
4. Compute the transform $H_{final}$ as $H_{final} = H_B \ H_A$ The data processor 20 may modify the calculated transform H to produce a user adjusted transform $H_{adj}$ 60 that is output by the data processor 20. The homography can be adjusted as follows:

To achieve an improved digital image 120 midway in appearance between the original digital image 102 and the image warped by the homography H, the homography can be mixed with an identity matrix to create an adjusted homography $H_{adj}$ that is output from the data processor 20 as the transform 60.

$$H_{adj} = aH + (1-a) I \quad (7)$$

Where:
a is a user input preferably ranging between 0 and 1.
I is a 3×3 identity matrix.

Note that when a=0, the transform 60 is simply an identity matrix and consequently the improved digital image 120 is actually a copy of the digital image 102. When a=1, the adjusted homography $H_{adj}$ is identical to the calculated transform H.

The improved digital image 120 may have associated metadata indicating that a transform H was applied. The metadata may contain the gravity vector g and the transform H. Alternatively, the metadata associated with the improved digital image 120 may be the effective gravity vector $g_e$ for the improved digital image 120, calculated as $g_e$=H g.

The image processor 36 applies the transform 60 to the digital image 102 i(x,y) with X rows and Y columns of pixels to produce an improved digital image 120. Preferably, the position at the intersection of the image plane and the optical axis (i.e. the center of the digital image 102) has coordinates of (0,0). Preferably, the improved digital image o(m,n) has M rows and N columns and has the same number of rows and columns of pixels as the digital image 102. In other words, M=X and N=Y. Each pixel location in the output image o($m_o$, $n_o$) is mapped to a specific location in the input digital image i($x_o$,$y_o$). Typically, ($x_o$,$y_o$) will not correspond to an exact integer location, but will fall between pixels on the input digital image i(x,y). The value of the pixel o($m_o$,$n_o$) is determined by interpolating the value from the pixel values nearby i($x_o$,$y_o$). This type of interpolation is well known in the art of image processing and can be accomplished by nearest neighbor interpolation, bilinear interpolation, bicubic interpolation, or any number of other interpolation methods.

The transform 60 governs the mapping of locations (m,n) of the output image to locations (x,y) of the input image. In the preferred embodiment the mapping, which maps a specific location ($m_o$,$n_o$) of the output image to a location ($x_o$, $y_o$) in the input image, is given as:

$$\begin{bmatrix} x_t \\ y_t \\ w_t \end{bmatrix} = H^{-1} \begin{bmatrix} m_0 \\ n_0 \\ 1 \end{bmatrix} \quad (8)$$

where $[x_t \, y_t \, w_t]^t$ represents the position in the original digital image 102 in homogenous coordinates. Thus, $$x_0 = \frac{x_t}{w_t} \text{ and}$$

$$y_0 = \frac{y_t}{w_t}$$

Those skilled in the art will recognize that the point ($x_o$, $y_o$) may be outside the domain of the input digital image (i.e. there may not be any nearby pixels values). In the other extreme, the entire collection of pixel positions of the improved output image could map to a small region in the interior of the digital image 102, thereby doing a large amount of zoom. This problem can be addressed by the image processor 36 determining a zoom factor z that represents the zooming effect of the transform 60 and final $H_f$ is produced by modifying the transform 60 input to the image processor 36 as follows:

$$H_f = \begin{bmatrix} zh_{11} & zh_{12} & h_{13} \\ zh_{21} & zh_{22} & h_{23} \\ h_{31} & h_{32} & h_{33} \end{bmatrix} \quad (9)$$

$$\text{where } H = \begin{bmatrix} h_{11} & h_{12} & h_{13} \\ h_{21} & h_{22} & h_{23} \\ h_{31} & h_{32} & h_{33} \end{bmatrix}$$

where z is the largest number for which all pixel positions of the output improved digital image 120 map inside the domain of the digital image 102.

As with all resampling operations, care must be exercised to avoid aliasing artifacts. Typically, aliasing is avoided by blurring the digital image 102 before sampling. However, it can be difficult to choose the blurring filter as the sampling rate from the transform 60 varies throughout the image. There are several techniques to deal with this problem. With supersampling or adaptive supersampling, each pixel value o($m_o$, $n_o$) can be estimated by transforming a set of coordinate positions near ($m_o$,$n_o$) back to the digital image 102 for interpolation. For example, a set of positions [($m_o$+⅓,$n_o$+⅓) ($m_o$+⅓,$n_o$) ($m_o$+⅓,$n_o$−⅓) ($m_o$,$n_o$+⅓) ($m_o$,$n_o$) ($m_o$,$n_o$+⅓) ($m_o$−⅓, $n_o$+⅓) ($m_o$−⅓,$n_o$) ($m_o$−⅓,$n_o$−⅓)] can be used. The final pixel value o($m_o$,$n_o$) is a linear combination (e.g. the average) of all the interpolated values associated with the set of positions transformed into the digital image 102 coordinates.

Figure 4B:
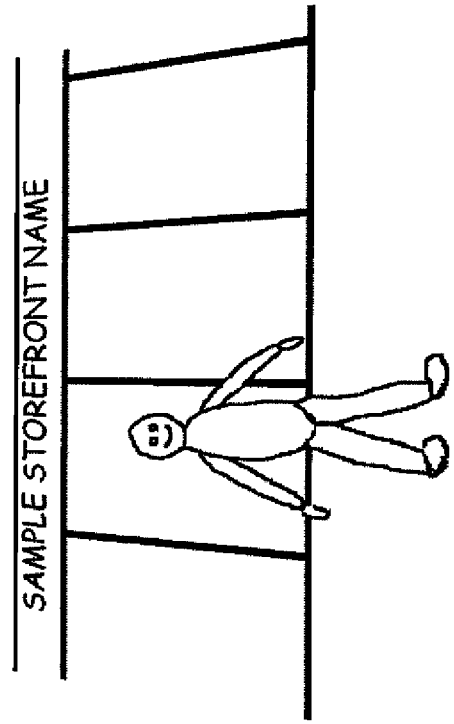
FIGS. 4a-4c show images with perspective and rotational distortions and FIG. 4d shows a corrected image in accordance with the present invention.
Figure 4D:
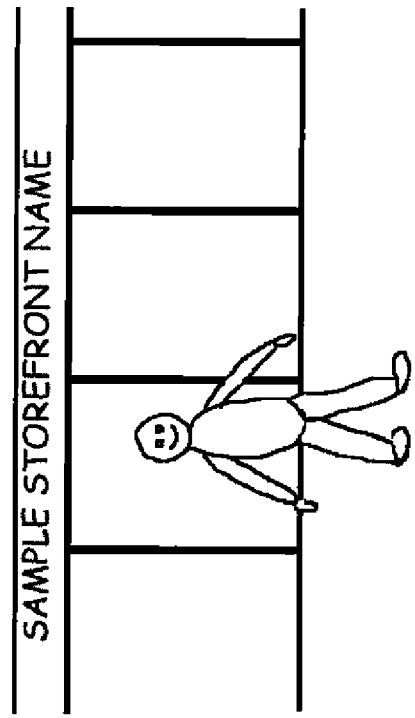
Figure 4A:
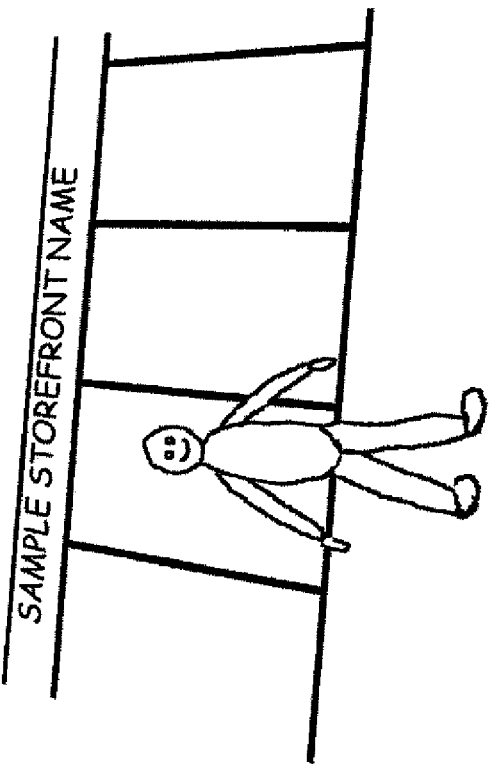
Figure 4C:
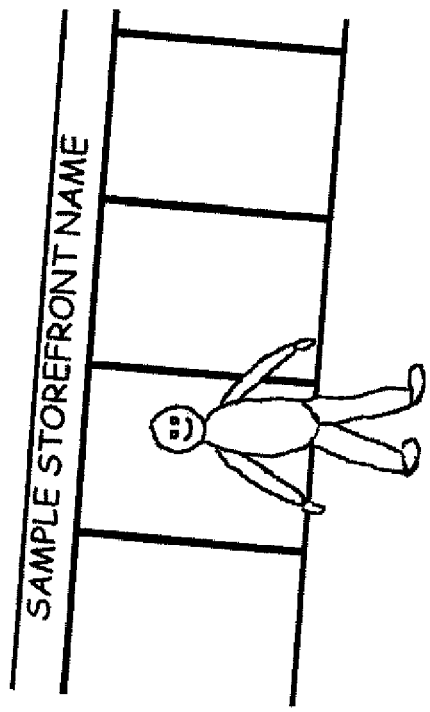

FIG. 4A shows an illustrative example image of a person standing in from of a store. FIG. 4B shows the resulting improved digital image 120 created by applying the homography transform 60 when in "Reduce Camera Rotation" mode. FIG. 4C shows the resulting improved digital image 120 created by applying the homography transform 60 when in "Reduce Perspective Distortion" mode. FIG. 4D shows the resulting improved digital image 120 created by applying the homography transform 60 when in "Reduce Perspective Distortion" and mode "Reduce Camera Rotation".

Figure 5B:
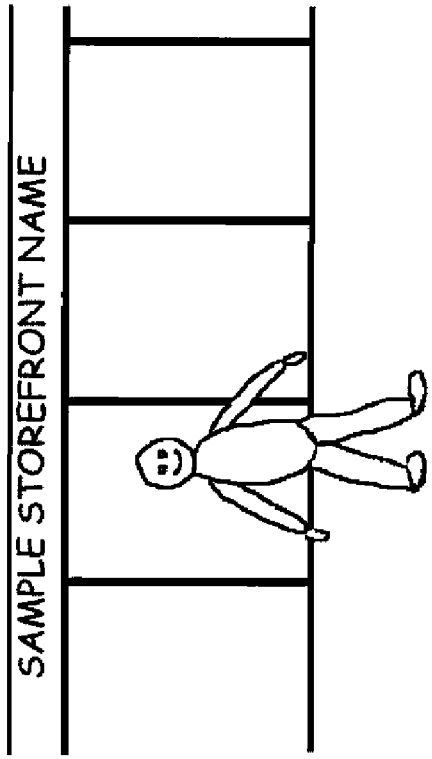
FIG. 5a show images with perspective distortions and FIG. 5b shows a corrected image in accordance with the present invention.
Figure 5A:
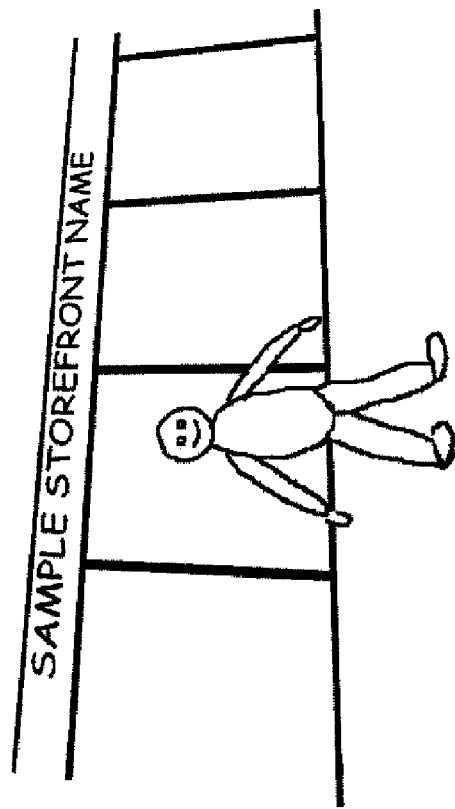

FIG. 5A shows an illustrative example of the digital image 102 and FIG. 5B shows the resulting improved digital image 120 created by applying the homography transform 60 when in "Rectify Plane" mode.

Figure 6:
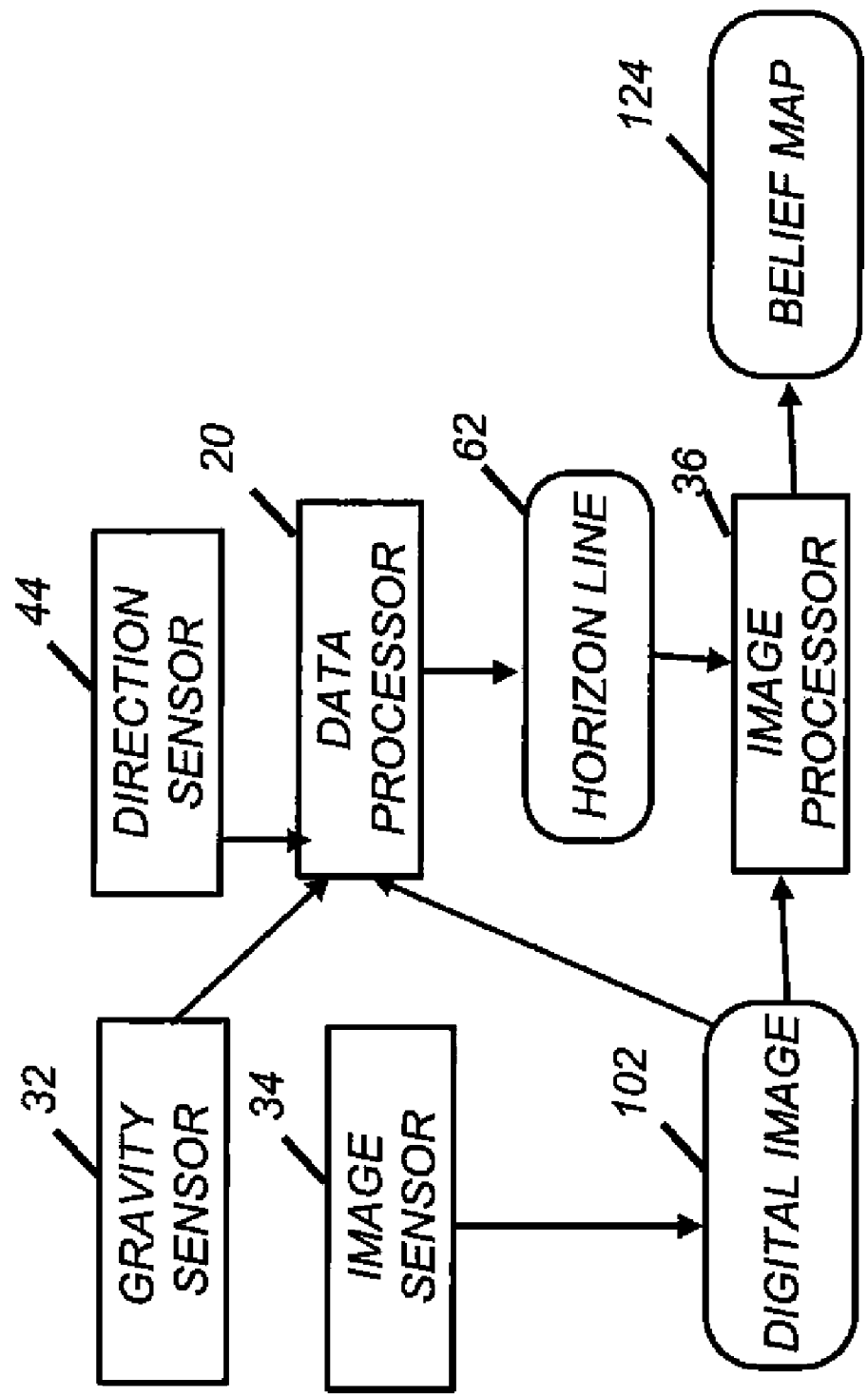
FIG. 6 is a block diagram similar to FIG. 3 of the components of a representative digital camera including a horizon line and a belief map.

FIG. 6 shows an alternative embodiment of the present invention where the gravity vector is used as a feature that improves the accuracy of pattern classification algorithms.

The data processor 20 computes the expected horizon line of the image. The horizon is the image of the ground plane at an infinite distance from the camera. In photography on planet earth, the horizon is approximately the line between the sky and the surface of the earth. The equation of the horizon line on the image plane as a function of the gravity vector is:

$$y = -\frac{x_g}{y_g}x - \frac{z_g}{y_g}f \quad (10)$$

where, as before, the gravity vector is specified g=$[x_g \, y_g \, z_g]'$ and f is the focal length in pixels. Note that the gravity vector is delivered by the gravity sensor, but as described herein above, the gravity vector can be refined by image analysis by finding vanishing points in the image in the data processor 20. However this is not always possible, as many images contain no vertical scene lines. Therefore, the horizon can be computed by using the gravity vector and the focal length. Note that the focal length f is unnecessary if the $z_g$ component of the gravity vector is zero, as the focal length term of equation (10) drops out of the equation.

The horizon line separates the image pixels into three sets: those pixels falling on the horizon line, those pixels above the horizon line, and those pixels below the horizon line. The set to which each image pixel belongs is found by computing the dot product of the gravity vector and the three-dimensional coordinate vector of a point p=$[p_1 \, p_2 \, p_3]'$ where $p_3$ is the focal length of the camera and p=$[p_1 \, p_2]'$ specifies the location of the pixel's position in the image plane.

If g'p<0 the point p is above the horizon line

If g'p=0 the point p is on the horizon line

If g'p>0 the point p is below the horizon line  (11)

The data processor 20 thus determines the position of points in the digital image 102 relative to the horizon.

Suppose the inventive camera is used on the ocean to capture images of the sky-water horizon. The horizon line computed with equations (10) or (11) should closely correspond to the boundary between sky and water in the image.

The horizon line has several important uses. First, when the horizon line is determined in the data processor 20 of FIG. 2, the horizon line can be used to compute the transform 60. For example, when the camera is in "Reduce Camera Rotation" mode, the horizon is computed. The goal of the transform 60 is to generate an improved digital image 120 by rotation so that the horizon is level. This is easily accomplished by determining the angle between the horizon line and either the x or y image axis and creating a rotation transform 60 to rotate the digital image 102 by the negative of that angle. This rotation matrix turns out to be identical to the one created in Equation (2). To summarize this embodiment, the gravity vector is used to determine a horizon which is used to create a transform 60 for generating an improved digital image 120 from the digital image 102. In this specific case, the transform 60 is used to modify the rotation of the image, thereby reducing the effect of unintentional camera rotation.

The image processor 36 computes a belief map from the digital image 102 and the horizon line and gravity vector output from the data processor 20. A belief map is a map indicating the likelihood, probability, or belief that a particular pixel or region (i.e. group of pixels) of the digital image 102 represents a specific material (such as sky, grass, water, human flesh, pavement or road surface, snow, etc.) The image processor 36 assigns probabilities based on features computed for a region or pixel of the digital image 102 such as color, texture, shape, or location within the image.

The image processor 36 uses the information computed by the data processor 20 (i.e. the horizon line) to determine the probability that a pixel or region in the image represents the specific material. The position of the pixel or region relative to the horizon is a useful feature because some materials have either very low or very high probability of occurring on only one side of the horizon. For example, if a pixel is below the horizon, then it has very low probability that it could represent sky (even though it might be within a blue colored region with very little texture.) If a pixel is above the horizon, it has a low probability that it could be water (even though it might have the color and texture features of water.) Likewise the horizon line can be used as a feature that aids in the recognition of grass, clouds, water, automobiles, pavement or road surface and even people. Therefore, a classifier is constructed to determine the probability that a particular pixel or region represents a given material, based on features including the position of the pixel or region relative to the horizon. Furthermore and in a similar manner, the horizon can be used as a feature for classifying the entire image into a scene type such as cityscape or landscape. For example, detection of the horizon aids in the detection of sky and water, which can be used to classify an image as a landscape or a cityscape.

To summarize, the gravity vector is used to find the horizon that in turn is used to perform scene and material classification.

Figure 7:
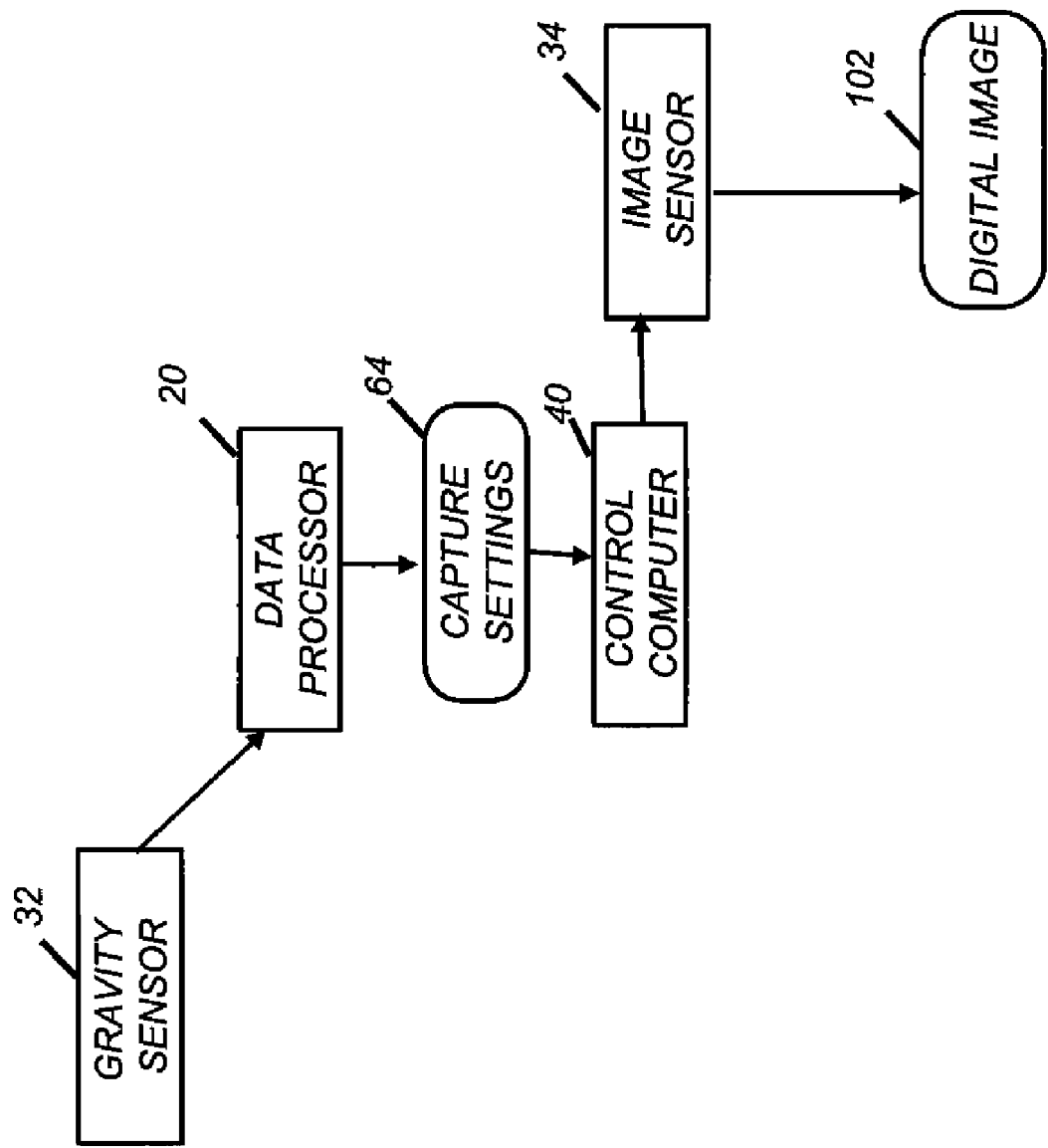
FIG. 7 is a block diagram similar to FIG. 3 of the components of a representative digital camera showing a capture setting to determine the exposure time of an image capture.

In a further embodiment of the inventive camera, a series of positional data is generated by the gravity sensor 32 and the direction sensor 44 prior to the image capture. For example, as soon as the capture button 15 begins to be pressed, the gravity sensor 32 and the direction sensor 44 may begin to generate positional data at a rate of 1 sample per 0.001 second. Referring to FIG. 7, this data is input to the data processor 20 for movement analysis. When it is determined that the camera has unacceptable movement, then the exposure time is decreased in order to prevent a blurred image. When the capture button 15 is fully depressed by the user, the typical sequence of events for image acquisition from the image sensor 34 is set into effect. At that time, the data processor 20 analyzes the data from the gravity sensor 32 and the direction sensor 44 for motion. Another input to the data processor 20 is the required exposure for the capture. The required exposure can be achieved by any number of combinations of aperture and exposure time. The aperture is the area of the exposed lens, so a larger aperture allows more photons to strike the sensor. Similarly, a longer exposure time allows more photons to strike the sensor. The final exposure is the product of the aperture and the exposure time.

Figure 8:
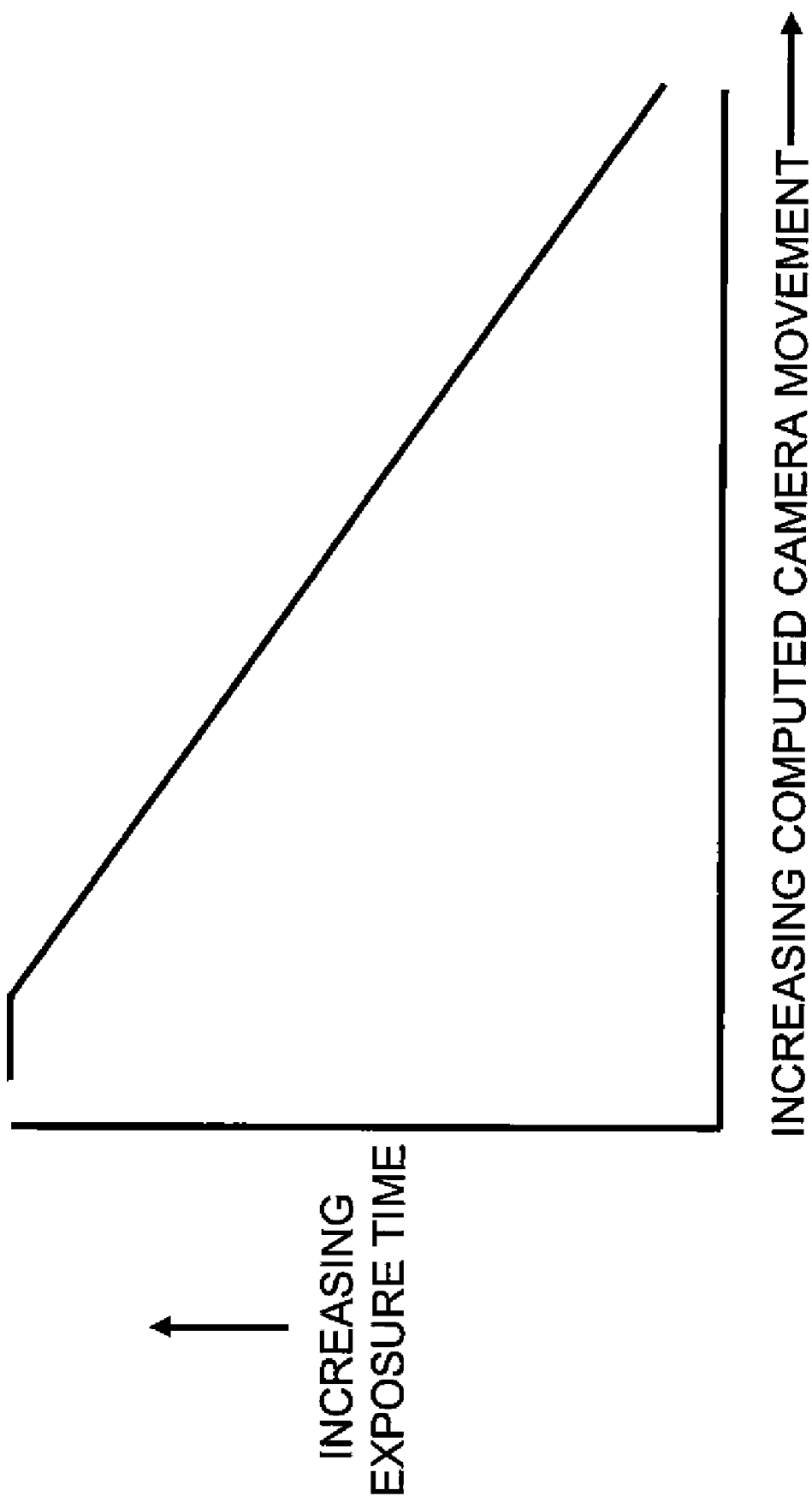
FIG. 8 is a graph of the relationship of camera movement and exposure time.

Aperture and exposure time are "traded off" to achieve different photographic effects. A larger aperture allows shorter exposure time, but at the cost of inducing depth of field (the effect of having only a narrow strip of the scene in focus). Alternatively, a small aperture forces a longer exposure time, but then blurriness may be induces by either movement in the scene or movement of the camera. It is often preferable to use as long an exposure time as possible, so that the aperture can be reduced and the depth of field effect is reduced. The data processor 20 analyzes the positional data to determine the steadiness of the camera and determines the optimal exposure time accordingly. The movement (also called jitter amount or camera jitter) in the stream of positional data $g_o$ to $g_n$ can be calculated by computing the standard deviation of the positional data, or by any number of alternative methods. If the movement is low, then the exposure time is computed as usual. However, if the movement is unacceptably high, then the exposure time is reduced to prevent capturing a blurred image. The data processor 20 then uses the computed value for the amount of camera movement to determine the optimal values for aperture and exposure time to achieve the desired exposure for the image. FIG. 8 shows the relationship between the computed camera movement and the selected exposure time. These optimal values are the capture settings 64 for the image, and are output from the data processor 20 and input by the control computer 40. The control computer 40 uses these capture settings 64 to capture the digital image 102 using the image sensor 34 as optimally as possible. Note that the positional data can only measure rotational changes of the camera's position about the origin, so translational motion of the camera (i.e. motion parallel to the x, y, or z-axis) will not affect the calculation of the capture settings 64.

The invention has been described in detail with particular reference to certain preferred embodiments thereof, but it will be understood that variations and modifications can be effected within the spirit and scope of the invention.

PARTS LIST

10 camera
15 capture button
20 data processor
22 user input device
30 display device
32 gravity sensor
34 image sensor
36 image processor
40 control computer
42 operation mode
44 direction sensor
50 optical axis
52 image plane

54 optical origin
60 transform
70 memory device
102 digital image
120 improved digital image

The invention claimed is:

1. A method of processing a digital image to produce an improved digital image, comprising: Using a computer to perform the following steps
   (a) receiving the digital image captured with a camera;
   (b) determining a first vanishing point associated with the digital image that relates to the direction of gravity relative to the coordinate system of the camera;
   (c) determining a second vanishing point associated with the digital image corresponding to a direction orthogonal the first vanishing point;
   (d) determining a transform for modifying the digital image based on the first vanishing point and the second vanishing point; and
   (e) applying the transform to the digital image to produce an improved digital image.

2. The method of claim 1 wherein the first vanishing point corresponds to the direction of gravity and is determined by a gravity sensor integrally formed with the camera or by analyzing the digital image to provide a vanishing point associated with vertical scene lines.

3. The method of claim 1, wherein the second vanishing point is associated with a set of horizontal lines in the scene.

4. The method of claim 3 further including using the transform to correct for unintentional camera rotations, perspective distortions, or combinations thereof.

* * * * *